Nov. 25, 1924.
H. S. KNIGHT
1,516,741
THERMOSTATICALLY ADJUSTED SIGHT LINE FOR CHART SCALES
Filed Oct. 9, 1922
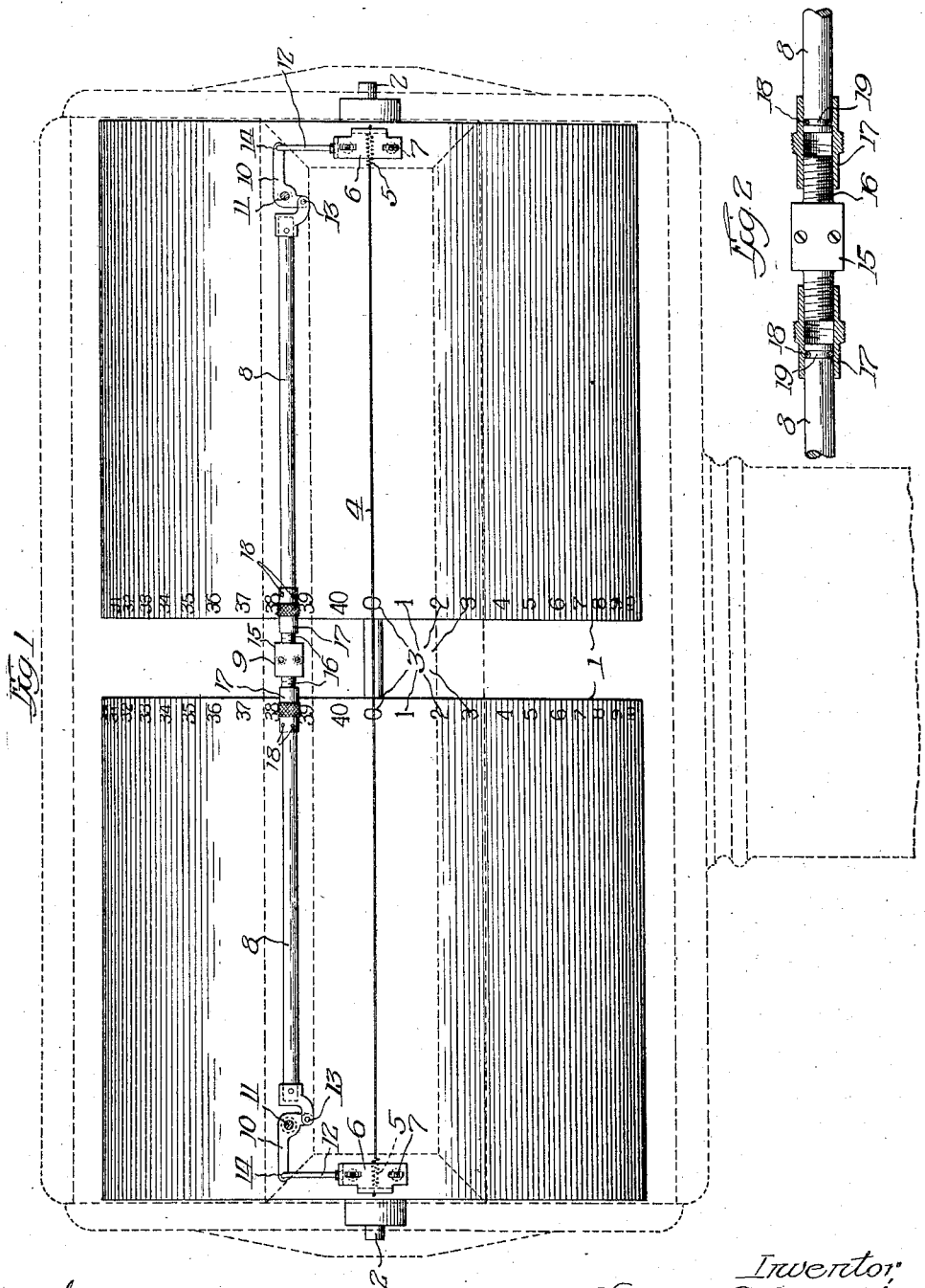
Inventor
Hervey S Knight,
By Wilkinson, Huxley, Byron & Knight
Attys.

Patented Nov. 25, 1924.

1,516,741

UNITED STATES PATENT OFFICE.

HERVEY S. KNIGHT, OF EVANSTON, ILLINOIS, ASSIGNOR TO SANITARY SCALE COMPANY, OF CHICAGO, ILLINOIS, A CORPORATION OF ILLINOIS.

THERMOSTATICALLY-ADJUSTED SIGHT LINE FOR CHART SCALES.

Application filed October 9, 1922. Serial No. 593,346.

*To all whom it may concern:*

Be it known that I, HERVEY S. KNIGHT, a citizen of the United States, residing at Evanston, in the county of Cook and State of Illinois, have invented certain new and useful Improvements in Thermostatically-Adjusted Sight Lines for Chart Scales, of which the following is a specification.

This invention relates to scales in which a chart moved conformably to the load to be weighed is marked with graduations that are brought successively into registry with a wire or other line stretched across the path of movement. In such scales, and particularly where a spring is employed for counterbalancing the load, the position of zero, when the chart is at a state of rest, varies with changes in temperature due to the expansion and contraction of the spring.

The present invention has for its primary object to provide means for thermostatically shifting the sight line to correspond with changes in the initial position of zero on the chart, and accordingly consists in anchoring the ends of the sight line upon movable plates or mountings and providing the thermostatic member or members in such relation thereto that the plates will be shifted in the direction of variation of zero position as the temperature of the atmosphere changes.

The invention has for another object to provide a construction and arrangement of thermostatic device and transmitting connections which will permit the parts to be conveniently arranged upon the frame of the window through which the scale is read, and accordingly another feature of the invention consists in mounting the movable line-anchoring plates upon the vertical ends of the frame and the thermostatic member or members upon the longitudinal sides thereof, and introducing between the ends of the thermostatic member or members and the anchoring plates motion translating members, such as bell crank levers, which will transfer the thermostatic motion in the longitudinal direction of the frame as a vertical motion in the direction of the end members thereof.

The invention has for still another object to provide means whereby the thermostatic member or members can be adjusted to initially shift the line anchoring plates and thereby establish accurate alignment of the latter with the reading line of the scale; and, accordingly, another feature of the invention consists in securing each thermostatic member to a normally stationary anchoring means in a manner to render the thermostatic member longitudinally adjustable in either direction.

In order that the invention may be fully understood, the preferred embodiment thereof has been disclosed in the accompanying drawings, in which—

Figure 1 is a front elevation of a pair of charts and their common reading line as employed in a chart scale for which the illustrative embodiment is particularly designed, also the thermostatic control for said line, the framing members of the scale together with that of the window being shown in dotted lines.

Figure 2 is a sectional detail view on an enlarged scale showing the construction of the adjustable abutments for the thermostatic members.

1 represent the chart of a scale usually divided into two members mounted to rotate about the axis 2 in order to bring their calibrations 3 successively into coincidence with a reading line 4. Reading line 4 is usually provided in the form of a thin wire held taut by a tension spring or springs 5 through means of which the line is anchored at horizontally fixed points, for instance, in anchor plates 6.

The present invention provides means for automatically shifting the anchor plates 6 in the direction of variations in the initial position of zero in the calibrations 3; and to this end each plate is secured to the scale through means of slot and pin connections 7 which permit it to move vertically, and said plates are brought under control of thermostatic members 8 having abutment 9 preferably made stationary, but with adjustment as hereinafter described. In order that thermostatic members 8 may be located with their longitudinal dimension in a direction transverse to the movement of the plates 6, the ends of said thermostatic members are connected to the plates through the medium of bell crank levers 10 fulcrumed at 11 and connected with the plates through links 12. In order that the motion of the thermostatic member may be multiplied in plates 6, bell crank levers 10 have short arms connected to the thermostatic members at 13 and relatively longer arms which receive the links 12 at 14. With the arrangement as thus far described, it is obvious that expansion and contraction of the thermostatic members 8 will be reflected in movements of the anchoring plates 6 inasmuch as the elongation of the counterbalancing spring generally employed in scales of this kind will result in shifting the chart in a direction which causes zero to move upward in the selected illustration, and elongation of the thermostatic members 8 will cause the plates 6 to move upward and carry with them the sighting line 4 to the same extent.

In order that thermostatic control may be employed for shifting the reading line 4 initially and cause it to coincide with readings extending in the direction of the axis of the chart, the fixed anchorage 9 comprises a block 15 secured to the scale and having screw studs 16 projecting on opposite sides thereof which receive threaded sleeves 17 in which the thermostatic bars 8 are rotatably secured by transverse pins 18 entering the wrist grooves 19 of the bars.

In this arrangement it is obvious that by turning either of the sleeves 17 in the appropriate direction, either plate 6 may be moved upward or downward with respect to the other plate, and the proper alignment of the reading wire 4 may be determined at will.

The expressions "sight line," "line," "reading line" or equivalent wording used in the specification are intended to convey any physical means for presenting in reading relation to the calibrations in the chart, a geometrical line serving to indicate the position or movement of the chart relatively to the position which the line defines.

In developing the reading lines for movable chart scales, it has heretofore been the practice to use either a means which in itself constitutes a physical line, usually in the form of a wire, or an engraved marking or line upon a transparent prism or window plate mounted in position to serve the same purpose.

I claim:

1. In a scale having a chart and a reading line relatively to which the chart moves, means for thermostatically shifting the reading line to compensate for changes in initial position of the chart due to variations in temperature.

2. In a scale, a chart, a reading line extending transversely to the direction of surface movement of the chart, mountings for said reading line movable in the direction of chart movement, and thermostatic means controlling the positions of said mountings.

3. In a scale, a chart, a reading line extending transversely to the direction of surface movement of the chart, mountings for said reading line movable in the direction of chart movement, and thermostatic means controlling the positions of said mountings; said thermostatic means extending at an angle to the direction of movement of said mountings, and there being motion translating means connecting the thermostatic means with said mountings.

4. In a scale, a sight line, mountings for said sight line movable transversely to the direction thereof, thermostatic rods connected with said mountings for moving them, and abutments for said thermostatic rods.

5. In a scale, a sight line, mountings for said sight line movable transversely to the direction of the line, rods connected with said mountings for moving them, abutments for said rods, and means for adjusting the rods relatively to their abutments and thereby determining the initial position of the line.

6. In a scale, a chart, a reading line for said chart, mountings for said reading line movable transversely to the direction of the line, rods extending substantially parallel with the reading line, an abutment for one end of each rod, and angle levers connecting the other ends of the rods with the mountings.

7. In a scale, a chart, a reading line for said chart, mountings for said reading line movable transversely to the direction of the line, rods extending substantially parallel with the reading line, an abutment for one end of each rod, and angle levers connecting the other ends of the rods with the mountings; said rods being independently adjustable relatively to their abutments.

Signed at Chicago, Illinois, this 6th day of October, 1922.

HERVEY S. KNIGHT.